(12) United States Patent
Ionescu

(10) Patent No.: US 10,356,047 B2
(45) Date of Patent: Jul. 16, 2019

(54) RPC CALL INTERCEPTION

(71) Applicant: CrowdStrike, Inc., Laguna Niguel, CA (US)

(72) Inventor: Ion-Alexandru Ionescu, San Francisco, CA (US)

(73) Assignee: CrowdStrike, Inc., Irvine, CA (US)

(*) Notice: Subject to any disclaimer, the term of this patent is extended or adjusted under 35 U.S.C. 154(b) by 1333 days.

(21) Appl. No.: 14/098,246

(22) Filed: Dec. 5, 2013

(65) Prior Publication Data

US 2015/0163109 A1    Jun. 11, 2015

(51) Int. Cl.
| | |
|---|---|
| *H04L 12/26* | (2006.01) |
| *H04L 29/06* | (2006.01) |
| *H04L 29/08* | (2006.01) |
| *G06F 9/54* | (2006.01) |
| *G06F 21/54* | (2013.01) |

(52) U.S. Cl.
CPC .......... *H04L 63/0281* (2013.01); *G06F 9/545* (2013.01); *G06F 9/547* (2013.01); *G06F 21/54* (2013.01); *H04L 63/1408* (2013.01); *H04L 67/2804* (2013.01); *H04L 67/2814* (2013.01);
(Continued)

(58) Field of Classification Search
CPC . H04L 63/0281; H04L 63/20; H04L 63/1408; H04L 67/142; H04L 67/2814; H04L 51/12; H04L 49/3009; H04L 47/10; H04L 45/02; H04L 43/062; H04L 43/08; H04L 67/2804; G06F 21/51; G06F 21/44; G06F 9/44505; G06F 9/468; G06F 9/544; G06F 9/547; G06F 17/30575; G06F 8/61; G06F 2209/542; G06F 9/545; G06F 21/54

USPC ........ 709/224, 203, 213, 206; 713/164, 171; 726/1; 719/313; 718/102; 370/389, 315, 370/392

See application file for complete search history.

(56) References Cited

U.S. PATENT DOCUMENTS

| | | | |
|---|---|---|---|
| 6,868,437 B1 * | 3/2005 | Gary ...................... G06F 9/547 |
| | | | 709/213 |
| 8,099,596 B1 | 1/2012 | Rusakov et al. | |

(Continued)

FOREIGN PATENT DOCUMENTS

| | | |
|---|---|---|
| JP | 2004509539 | 3/2004 |
| WO | WO2005043360 | 5/2005 |

OTHER PUBLICATIONS

The PCT Search Report and Written Opinion dated Feb. 24, 2015 for PCT Application No. PCT/US2014/065970, 9 pages.
(Continued)

*Primary Examiner* — Jungwon Chang
(74) *Attorney, Agent, or Firm* — Lee & Hayes, P.C.

(57) ABSTRACT

A service proxy is described herein. The service proxy is configured to act as an intermediary between a client and a service. The service proxy may observe communications, modify communications, log communications, or the like, particularly so as to enhance the security and reliability of the host device. In some implementations, the service proxy may cooperate with an operating system to take over a named port object. In some implementations, the service proxy may receive messages as an intermediary between the client and the server. In some implementations, the service proxy may attach to a shared memory to intercept communications. In some implementations, the service proxy may be injected into a client process to appear to be the client itself.

19 Claims, 5 Drawing Sheets

(52) U.S. Cl.
CPC ...... *G06F 2209/542* (2013.01); *H04L 67/142* (2013.01)

(56) References Cited

U.S. PATENT DOCUMENTS

| | | | |
|---|---|---|---|
| 8,191,162 B1* | 5/2012 | Shukla | G06F 21/44 713/165 |
| 2003/0014466 A1* | 1/2003 | Berger | G06F 9/468 718/102 |
| 2004/0261081 A1 | 12/2004 | Sen | |
| 2005/0022063 A1 | 1/2005 | Grebenev | |
| 2005/0033777 A1* | 2/2005 | Moraes | G06F 17/30575 |
| 2005/0149726 A1* | 7/2005 | Joshi | G06F 21/51 713/164 |
| 2006/0114899 A1* | 6/2006 | Toumura | H04L 49/3009 370/389 |
| 2007/0028291 A1* | 2/2007 | Brennan | H04L 63/1408 726/1 |
| 2008/0034429 A1 | 2/2008 | Schneider | |
| 2009/0022081 A1* | 1/2009 | Hagiwara | H04L 47/10 370/315 |
| 2009/0070878 A1 | 3/2009 | Wang et al. | |
| 2009/0144410 A1* | 6/2009 | Fink | H04L 43/062 709/224 |
| 2009/0193074 A1* | 7/2009 | Lee | G06F 21/51 709/203 |
| 2010/0121927 A1* | 5/2010 | Zhang | G06F 9/468 709/206 |
| 2010/0175104 A1 | 7/2010 | Khalid | |
| 2011/0026527 A1* | 2/2011 | Shao | H04L 12/4666 370/392 |
| 2011/0239227 A1* | 9/2011 | Schaefer | G06F 9/44505 719/313 |
| 2012/0113989 A1* | 5/2012 | Akiyoshi | H04L 45/02 370/392 |
| 2013/0111211 A1* | 5/2013 | Winslow | H04L 9/3234 713/171 |
| 2015/0106363 A1* | 4/2015 | Miyata | G06F 12/00 707/723 |

OTHER PUBLICATIONS

Burns, "Fuzzing Win32 Interprocess Communication Mechanisms", retrieved on Mar. 29, 2017 at <<http://web.archive.org/web/20061124075015/http://www.blackhat.com/presentations/bh-usa-06/BH/US-06-Burns.pdf>>, Black Hat 2006, 36 pages.

Curry, et al., "Extending Message-Oriented Middleware using Interception", International Workshop on Distributed Event-Based Systems (DEBS 2004), W18L Workshop, 26th International Conference on Software Engineering, vol. 2004, Jan. 1, 2004, pp. 32-37.

The Extended European Search Report dated Apr. 21, 2017 for European Patent Application No. 14867682.8, 11 pages.

Jones, "Interposition Agents: Transparently Interposing User Code at the System Interface", SIGOPS, vol. 27, No. 5, ACM, 1993, pp. 80-93.

Rashid, et al., "Accent: A communication oriented network operating system kernel", retrieved on Mar. 29, 2017 at <<http://dl/acm.org/ft_gateway.cfm?id=806593&ftid=53429&dwn=1&CFID=917425327&CFTOKEN=31787412>>, ACM, 1981, pp. 64-75.

The Japanese Office Action dated Jul. 10, 2018 for Japanese patent application No. 2016-536780, a counterpart foreign application of U.S. Appl. No. 14/098,246.

The European Office Action dated Sep. 20, 2018, for European Application No. 14867682.8, a counterpart foreign application of the U.S. Appl. No. 14/098,246, 8 pages.

* cited by examiner

RPC CALL INTERCEPTION

BACKGROUND

Computer system administrators may collect various data related to the use of system resources to help characterize the use of the system resources, particularly with intent to prevent unauthorized access, identify malicious software, or to improve the allocation of the system resources, among other reasons.

Collection of this data may traditionally be accomplished by attaching an observer to a kernel and/or system call interface of an Operating System (OS). Accordingly, when a user-level process requests system resources using the observed kernel system call, the observer may collect data and analyze the data as appropriate.

But Operating Systems have grown in functionality to support interfaces to system resources other than kernel systems calls. For example, an OS may provide functionality via a Remote Procedure Call (RPC) interface. In some instances, the RPC interface may be implemented as a Local Procedure Call (LPC) interface configured to use RPC-style transport, serialization, and runtime-binding to perform LPC system calls without actually sending a call to a remote system.

Some LPC interfaces exist entirely in userspace, preventing any traditional form of observation by intercepting kernel system calls. Other LPC interfaces also reside in userspace and can make a kernel system call on behalf of the client, thereby masking the identity of the client process because the system call may appear to originate from the LPC interface.

In general, an LPC interface may not lend itself to observation by a kernel system call as described above. Thus, despite the use of various kernel observers, any calls made to the LPC interface may remain uncollected and unanalyzed. Accordingly, the computer system administrators may capture an incomplete picture of the use of system resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, a security agent that operates on a host computing device, including mobile devices and embedded systems, as a service proxy. By acting as a proxy for an existing service, the service proxy may receive client communications addressed to the existing service, may process the client communications, may transparently invoke the existing service, and may similarly proxy return communications from the service to the client. Accordingly, the service proxy may capture process interactions with LPC services.

In general, a service may be any computer program providing an interface to perform work on the behalf of another process. In various embodiments, the service may be run as a background process and may communicate with the process by sending messages. The service may be available to multiple users. For example, a computer program for performing DNS lookups may be implemented as a service, and may perform DNS lookups for all of the users of a system.

In general, the communications between a client and a service may be part of a communication session. The communication session may be created by the service on a per-client basis. In general, the communication session may be associated with a session state describing the session. In some embodiments, the communication session may be stateless. In some embodiments, the communication session may be as simple as the existence of as an interface for communication that is not associated with a state nor associated with ongoing communications.

In various embodiments, the service proxy may be configured to run in user mode. However, some of the operations performed by the service proxy may not be available in user mode, thus the service proxy may be configured to perform a subset of operations in a more permissive mode, such as kernel mode.

Example Architecture

Figure 1:
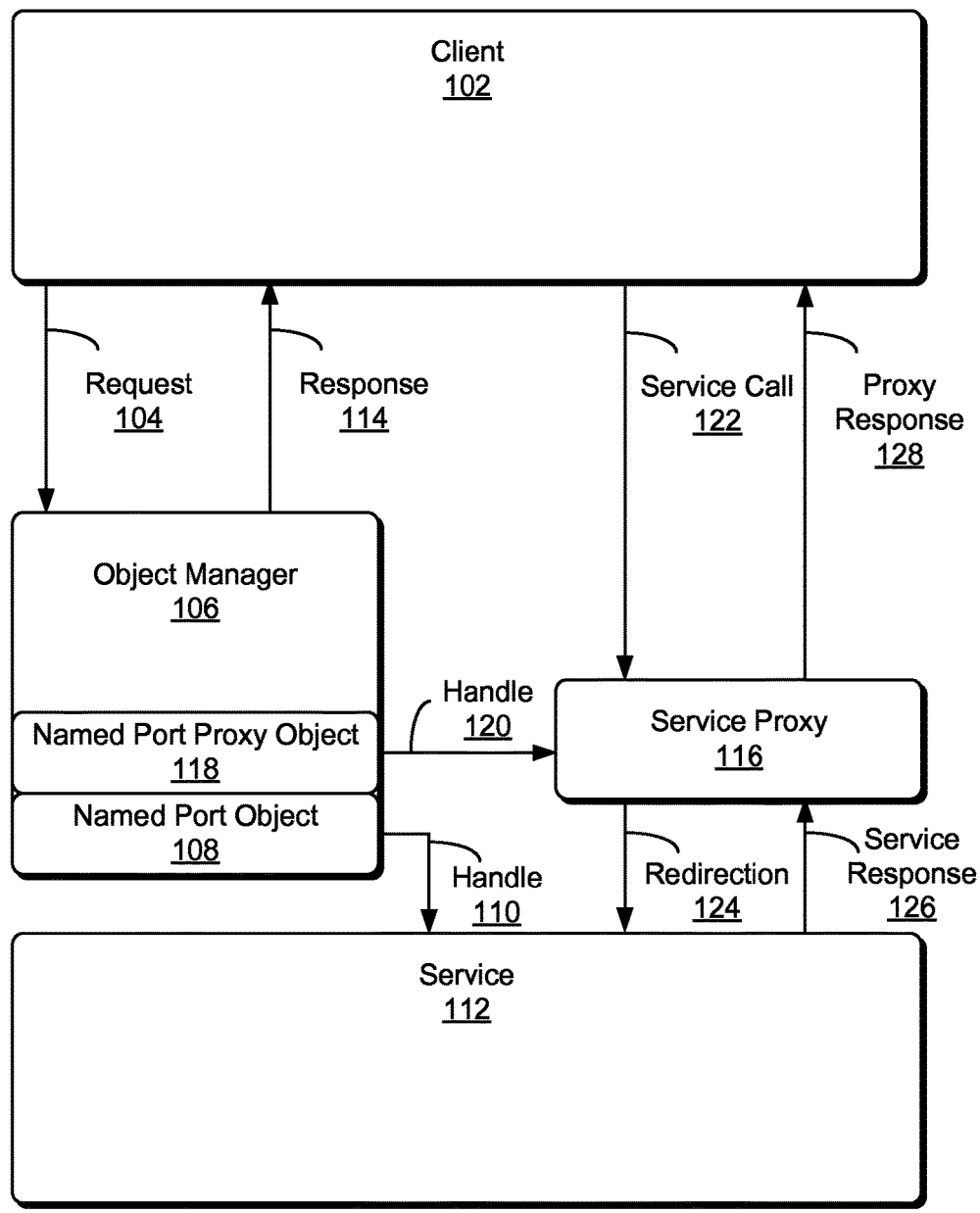
FIG. 1 illustrates an example architecture depicting an LPC interface for requesting an interface to a service, including a name switch used to insert a service proxy.

FIG. 1 illustrates an example architecture depicting an LPC interface for requesting an interface to a service, including a name switch procedure used to insert a service proxy. As illustrated in FIG. 1, a client 102 may make a request 104 to an object manager 106 to receive a named port object 108. For example, the request 104 may indicate a request for a service having a particular name or otherwise identify the requested service by reference. Although the example of FIG. 1 describes the interface to the service as a port, other interface techniques are contemplated herein, including interfacing via files, signals, sockets, messages, message queues, pipes, named pipes, semaphores, shared memory, message passing, memory mapped files, or the like.

The request 104 may conform to an Interface Description Language (IDL) definition. An IDL definition may be a file that describes an interface to a service. In general, an IDL may be used to generate a stub, wherein the stub may be configured to convert service parameters and to gather data to transfer to another process and/or address space. For example, the client 102 may wish to communicate with a service existing in another address space, and if the client sends a pointer to data in the client's address space, the service may not be able to access the data. The stub may help move the data into an area that may be copied from the client address space to the service address space. Thus, the client 102 may use an IDL definition to form the request 104.

In various embodiments, the request 104 may be an LPC request, including an RPC layer encapsulating a variety of information. The RPC layer may be decoded to provide information related to the client 102 such as the process identifier (PID), thread identifier (TID) and so forth.

The object manager 106 may include a namespace that facilitates lookup of an object by name. For example, the object manager 106 may receive the request 104 and search its namespace for an object associated with the particular name. In various examples, the object and/or a reference to the object may then be provided to the client 102. The client 102 may then bind to the object, for example via a request to an RPC runtime (not shown). The RPC runtime may be configured to verify that the request 104 conforms to the IDL for the requested service in response to receiving the request 104.

The object manager 106 may be configured to store port objects, such as the named port object 108. In general, port objects may provide specific details that enable a caller to communicate with a service as well as to limit access to the service. For example, a port object may specify an Access Control List (ACL) limiting access by one or more rules and/or may specify a required security identifier. Furthermore, a port may provide the communicating parties with information about the other communicating parties, including identification information.

After receiving the request 104, the object manager 106 may determine a handle 110 associated with the named port object 108, the handle referencing a service 112 associated with the particular name. The object manager 106 may then form a response 114 including a reference to the handle 110 and return the response 114 to the client 102.

Figure 5:
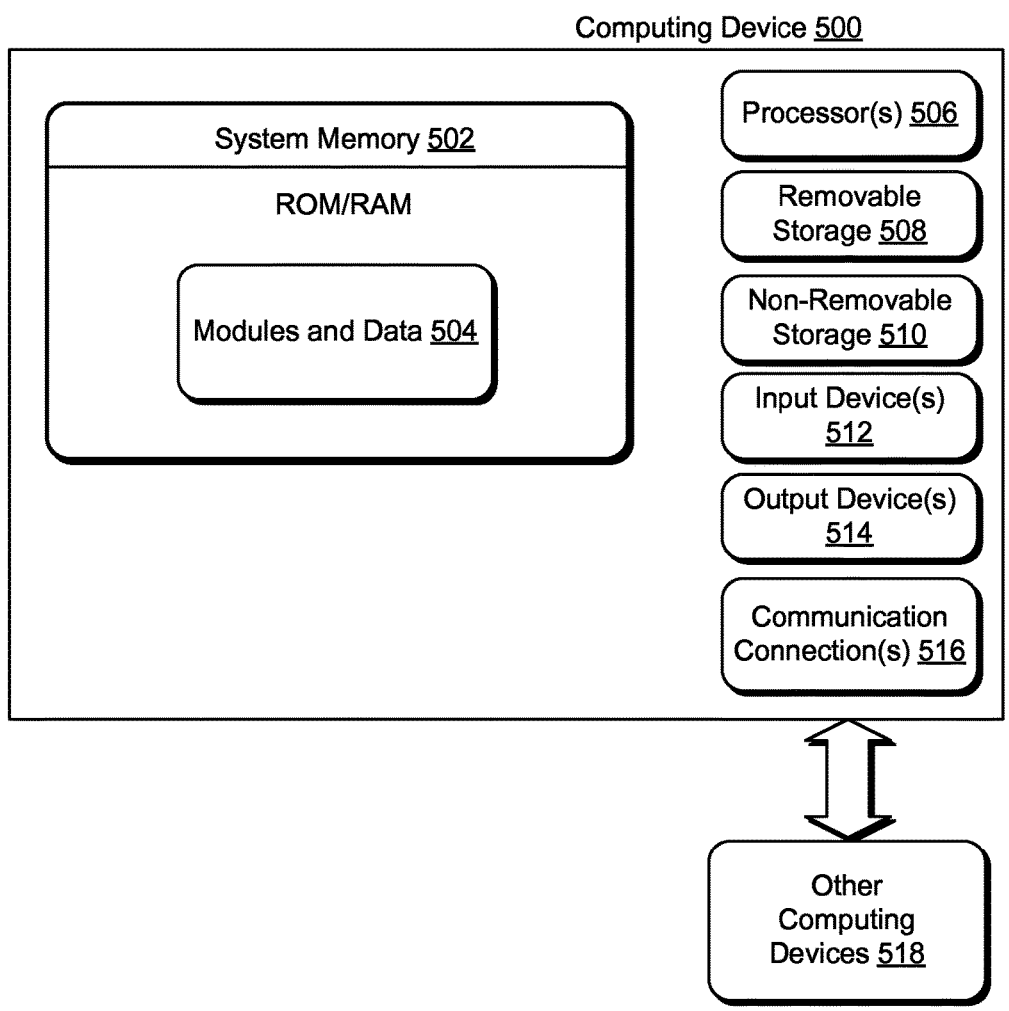
FIG. 5 illustrates a component level view of a computing device capable of acting as the proxy.

However, in the example of FIG. 1, a service proxy 116 is introduced to proxy communications between the client 102 and the service 112. In general, the service proxy 116 may have less-than kernel-level privileges. However, some operations may require kernel-level privileges, which may be implemented using a kernel-level process to perform one or more kernel-level actions on behalf of the proxy, or by calling kernel resources. In various examples, the service proxy 116, acting with kernel privileges, may intercept the request 104 at the object manager 106 and may rename the named port object 108 to another name. For example, supposing the named port object 108 had an original name of "DNSLookup," the named port object 108 may be renamed to "DNSLookup-Original." In another example, the service proxy 116 may rename the named port object 108 to another name, even absent the request 104. Accordingly, after renaming, the named port object 108 may not be accessible using the original name via the object manager 106. An example computing device capable of serving as a device implementing the service proxy 116 is illustrated in FIG. 5 and described below with reference to that figure.

In other embodiments, the service proxy 116 may be configured to respond to the creation of the named port object 108 and may rename the named port object 108. For example, when the object representing the named port object 108 is created, an event may be created to notify the service proxy 116 of the new object, the named port object 108. The named port object 108 may be renamed in response to the event.

In various embodiments, the service proxy 116 may be configured to reference an IDL describing the service 112. For example, the service proxy 116 may need the IDL to faithfully perform the proxy functions. The IDL describing the service may sometimes be missing or otherwise inaccessible. For example, a software update may update a service without providing an accessible copy of the IDL to the service proxy 116. In such cases, the service proxy may be stopped, a named port proxy object 118 may be removed from the object manager 106, the named port object 108 may be reverted to have its original name, and the client 102 may be bound to the service 112 using the handle 110. In other examples, the service proxy 116 may remain, but may take a less active role in performing proxy functionality.

The service proxy 116 may add an entry to the object manager 106 using the original name. In the example of FIG. 1, the named port proxy object 118 may be added to the object manager 106 associated with the original name, for example "DNSLookup." Accordingly, the named port proxy object 118 may take-over the original name. The named port proxy object 118 may be configured to reference the service proxy 116 by a handle 120. The handle 120 may be provided to the client 102 via the response 114, allowing the client 102 to access the service proxy 116.

In this example, the client 102 sent the request 104 for the named port object 108 and received a handle 120 referencing the service proxy 116. Accordingly, the client 102 may make a service call 122 to the service referenced by the handle 120 expecting to call the service 112, but may instead call the service proxy 116. The service proxy 116 may receive the service call 122, observe the call, log details, and/or modify the call, and may redirect the call to the service 112 via a redirection 124.

In general, the redirection 124 may require changing the message sent via the service call 122 and/or creating a new message based on the service call 122. These changes may include modifying an indicated message recipient, an indicated message sender, a PID, a TID, a sequence number, and/or an indication of state, or the like. These changes may further include "marshaling." Marshaling may comprise such acts as transforming memory representations of data, serializing data, deserializing data, complying with interface requirements, or the like.

In various embodiments, the redirection 124 may be performed by directly calling the service 112. In various embodiments, the service proxy 116 may request, from the object manager 106, a handle associated with the (renamed) named port object 108, and may receive the handle 110 referencing the service 112. The service proxy 116 may then perform the redirection 124 using the handle 110.

In some examples, the service proxy 116 may receive a service response 126. The service proxy 116 may observe the service response 126, log details, and/or modify the service response 126, and may provide a proxy response 128 to the client 102. In some examples, the proxy response 128 is the same as the service response 126. In other embodiments, the service proxy 116 may modify portions of the service response 126 to create the proxy response 128. Similar to marshaling, as described above, the service proxy 116 may remarshal the service response 126 to produce the proxy response 128. Accordingly, the service proxy 116 may provide transparent proxy service to the client 102, intercepting the service call 122 and returning the proxy response 128, all while providing opportunity for the service proxy 116 to observe, log, and modify as appropriate.

In general, the service proxy 116 may be configured to perform actions, including security-related actions, or may be part of a security agent which performs such actions. In some embodiments, the service proxy 116 or other component(s) of the security agent may determine that the client 102 includes malicious software, and may disrupt one or more service calls to reduce the impact of the malicious software. For example, referencing the example of FIG. 1, assuming that the client 102 is malicious and performs the service call 122 to get a DNS lookup for a malicious server from the service 112, the service proxy 116 or other component(s) of the security agent may detect the request as malicious either in response to receiving the service call 122 or in response to receiving the service response 126. The service proxy 116 or other component(s) of the security agent may then "sinkhole" the DNS request by providing a fake DNS address via the proxy response 128. Thus, the malicious software of the client 102 may be unable to lookup the malicious server and the damage may be limited. An example of such a security agent is described in U.S. patent application Ser. No. 13/492,672 filed on Jun. 8, 2012, entitled "Kernel-Level Security Agent," which is incorporated herein by this reference.

In various embodiments, the service proxy 116 may be configured to appear to the client 102 as being functionally indistinguishable from the service 112. In some embodiments, the service proxy 116 may be entirely indistinguishable from the service 112. To maintain the illusion of identity, the service proxy 116 may appear to behave suboptimally. For example, supposing the service proxy 116 identifies the service call 122 as malformed, an optimal behavior may be to immediately reject the service call 122. However, this may drop the illusion of identity by, among other things, never contacting the service 112 via the redirection 124, thereby eliding any side effects created by the service 112 such as error handling and error logging. Thus, in spite of the optimal behavior, the service proxy 116 may pass the malformed service call 122 using the redirection 124.

In various embodiments, the service proxy 116 may not be able to call the redirection 124. For example, if the service proxy 116 receives the service call 122 but experiences an out of memory error before sending the redirection 124, it may not be possible and/or may not be desirable to send the redirection 124. In some examples, upon receiving the out of memory error, the service proxy 116 may be configured to "clean up" memory usage and return some memory to the system, and may thereafter try performing the redirection 124. In some examples, the service proxy 116 might be configured to do whatever an RPC runtime would have done in the case of running out of memory while processing the service call 122.

In various embodiments, the service proxy 116 may be configured to keep track of a state of interaction between the client 102 and the service 112. For example, the state of interaction may indicate whether the client 102 is bound to the service proxy 116, whether the client 102 is bound to the service 112, whether the service proxy 116 can read any of the request 104, the response 114, the service call 122, and/or the service response 126, and/or whether the service 112 can read the redirection 124. In some embodiments, determinations of the state may not be conclusively discernible; however the service proxy 116 may deduce and/or indicate an estimated state.

Figure 2:
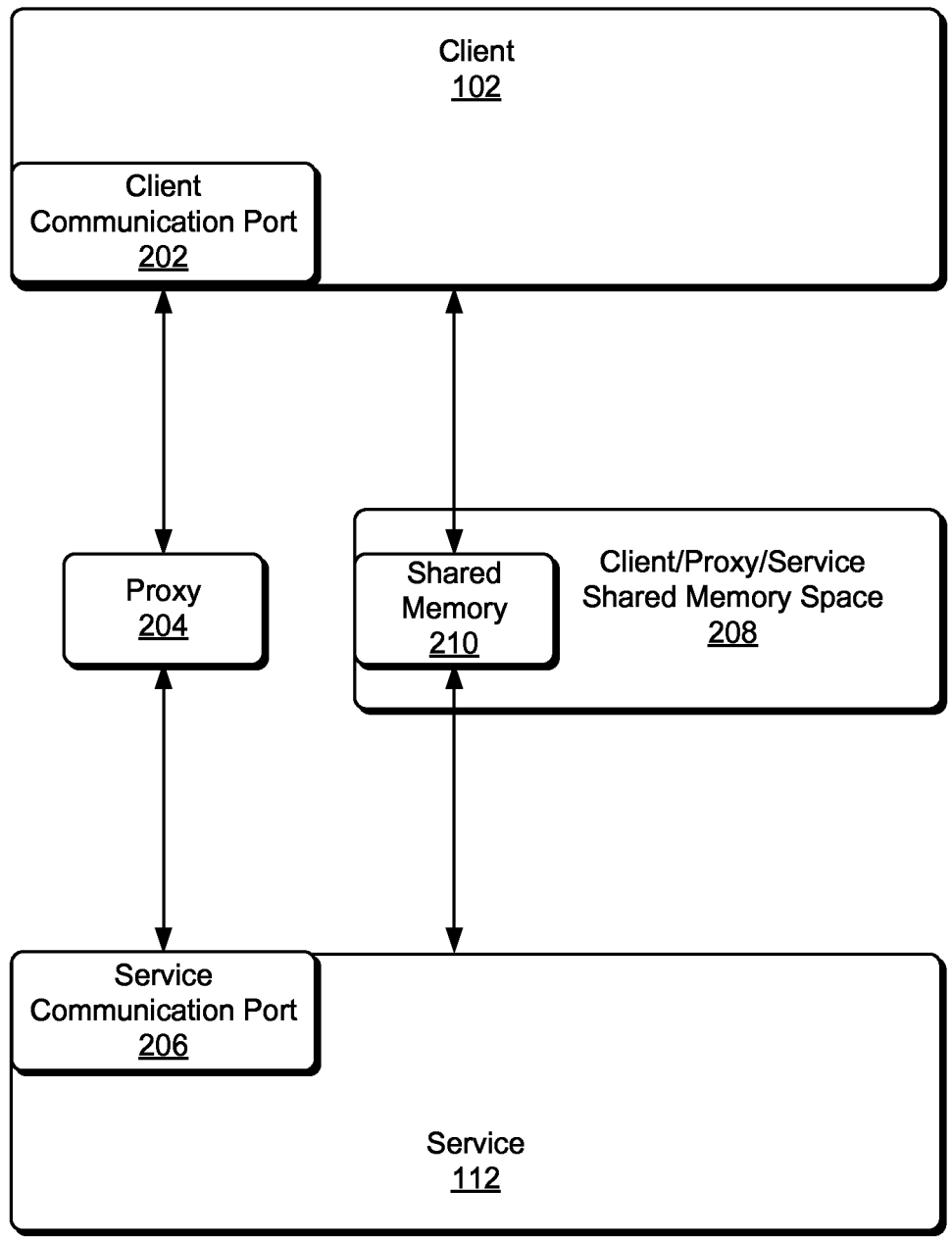
FIG. 2 illustrates an example architecture depicting communications between a client and a service via a proxy.

FIG. 2 illustrates an example architecture depicting communications between a client and a service via a proxy. As described here, particularly with respect to FIG. 1, the client 102 may generally communicate with the service 112. In the example of FIG. 2, a client communication port 202 existing in the address space of the client 102 may be configured to receive data from the client 102 for deliver to the service 112, as well as to receive data from the service 112 for delivery to the client 102.

In general, the client 102 may exist in a different address space than the service 112. Accordingly, data must be ferried back and forth between the client 102 and the service 112. In general, a kernel-mode process—being unrestricted by memory protection rules—may move the data on behalf of the client 102 and the service 112.

A proxy 204 may be positioned between the client communication port 202 and a service communication port 206. In general, the proxy may be inserted using techniques similar to those described with respect to the service proxy 116 herein, particularly with respect to FIG. 1. For example, a bind request from the client 102 may be intercepted, the proxy 204 may be created as an intermediary, and the client communication port 202 may be bound to the proxy 204. Additionally, the proxy 204 may be bound to the service communication port 206. Furthermore, the proxy 204 may be configured to appear to the client 102 as being functionally indistinguishable from the service communication port 206. In some embodiments, the proxy 204 may be entirely indistinguishable from the service communication port 206 from the perspective of the client 102. In various embodiments, client communication port 202, the proxy 204, and/or the service communication port 206 may be particular to a session between the client 102 and the service 112 via the proxy 204. In various embodiments, the client communication port 202, the proxy 204, and/or the service communication port 206 may not be indexed by the object manager 106, for example not indexed by name. In various embodiments, the proxy 204 may belong to a proxy service process. An example computing device capable of serving as a device implementing the proxy 204 is illustrated in FIG. 5 and described below with reference to that figure.

In various embodiments, the proxy 204 may observe, log, and/or modify messages between the client communication port 202 and the service communication port 206.

In general, communication between the client communication port 202 and the service communication port 206 may be limited to smaller messages. When larger messages are sent another form of communication is used to take advantage of shared memory.

In general, shared memory includes a portion of physical memory mapped by one or more memory addresses existing in a respective address space for multiple processes. The one or more memory addresses may be virtual addresses. In various embodiments, different virtual addresses may map to a same physical address. For example, a shared memory may include a page of physical memory addressed by a first virtual address of a first address space and a second virtual address of a second address space. Accordingly, multiple processes may concurrently access the shared memory. In general, the shared memory may account for a subset of the total address space of any encompassing process.

In the example of FIG. 2, a client/proxy/service shared memory space 208 includes a shared memory 210. In general, the client 102 attached to the shared memory space 208 and expects the service to attach to the shared memory space 208. In this case, the proxy also attaches to the shared memory space 208. Accordingly, the proxy gains access to the shared memory 210.

In various embodiments, the client 102 communicates with the service 112 by populating the shared memory 210 with a message payload (i.e. a data of a larger communication). A smaller communication is then sent from the client communication port 202 destined to the service communication port 206. In general, the smaller communication may block a thread of the calling process in the client 102.

In a typical example, the client 102 may expect the service communication port 206 to receive the smaller communication, read the larger communication in the shared memory 210, and act on the data of the larger communication. The service 112 may then reply to the smaller communication or otherwise release the smaller communication from blocking the thread.

In the example of FIG. 2, however, the proxy 204 receives the smaller communication from the client communication port 202. At this time, the proxy 204 may examine the contents of the shared memory 210 before the service 112 even receives notification of the smaller communication. After the proxy 204 is finished, the proxy 204 may send another smaller message to the service communication port 206. The other smaller message may be the same as the smaller message or may be created based on the smaller message.

The service 112 may reply to the client 102 using a smaller reply message from the service communication port 206 to the client communication port 202, by way of the proxy 204, and/or the service 112 may reply to the client using a larger reply message written into the shared memory 210. Before the blocked thread of the client 102 is released, the proxy 204 may inspect and/or modify either of the larger reply message or the smaller reply message.

As described above, particularly with respect to FIG. 1, it may be desirable that the proxy 204 appears indistinguishable from the service communication port 206 as seen from the client 102, and vice versa as seen from the service 112. However, the proxy 204 may have a different PID and/or TID than either of the client communication port 202 or the service communication port 206. Accordingly, the proxy 204 may send messages including identifying information that may notify either of the client 102 or service 112 of the presence of a third party. Various embodiments designed to address this issue will be discussed further herein, particularly with respect to FIGS. 3 and 4.

Figure 3:
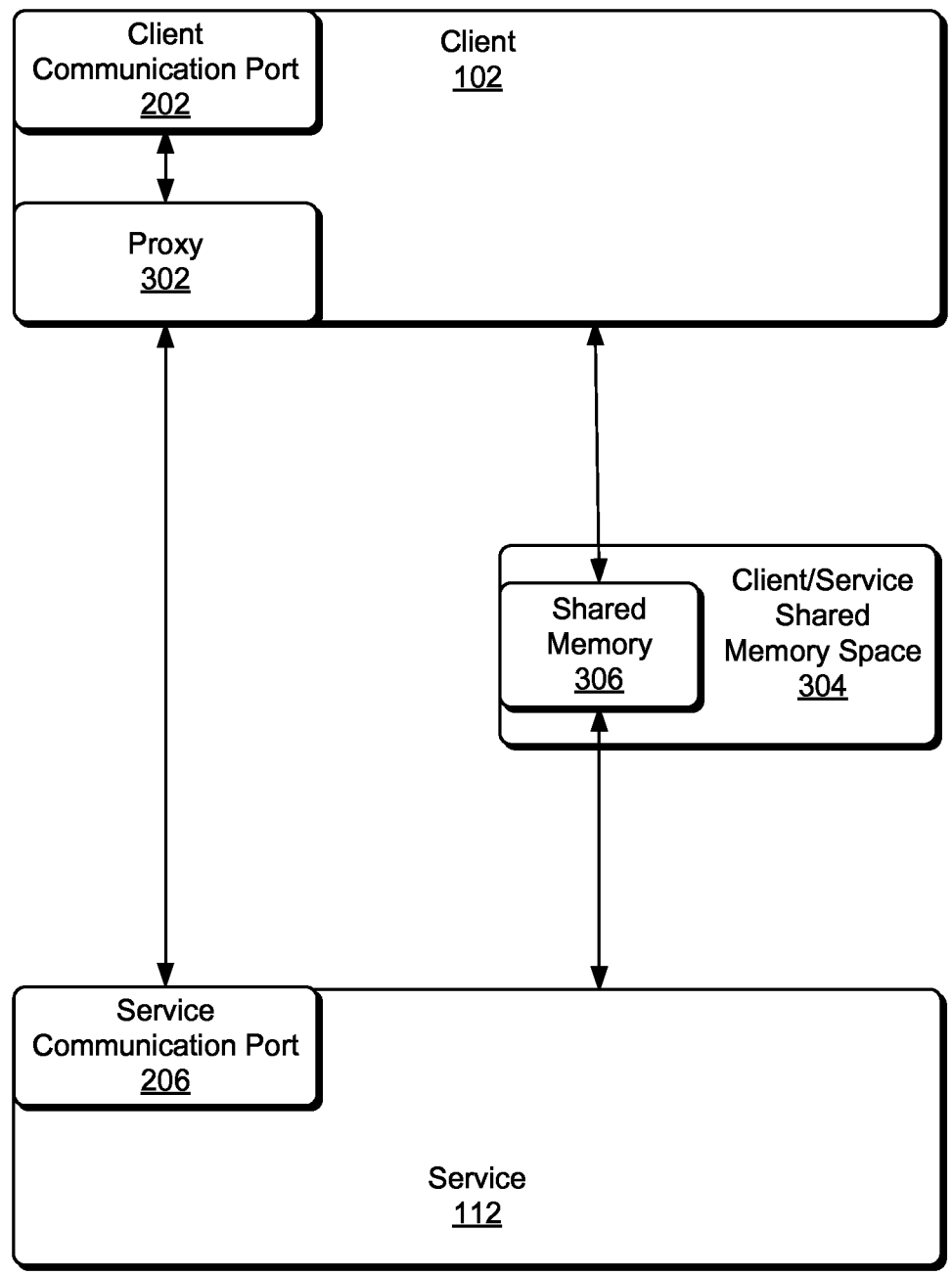
FIG. 3 illustrates an example architecture depicting a thread injected into a client to perform communications between a client and a service via a proxy.

FIG. 3 illustrates an example architecture depicting the injection of an executable code into a client to perform communications between a client and a service via a proxy. In various examples, the executable code may be implemented as a thread within a process associated with the client. As described herein, particularly with respect to FIGS. 1 and 2, the client 102 may generally communicate with the service 112, including communicating from the client communication port 202 to the service communication port 206. In the example of FIG. 3, a thread running a proxy 302 is injected into the address space of the client 102. In various embodiments, client communication port 202, the proxy 302, and/or the service communication port 206 may be particular to a session between the client 102 and the service 112 via the proxy 302. In various embodiments, the client communication port 202, the proxy 204, and/or the service communication port 206 may not be indexed by the object manager 106, for example not indexed by name. The proxy 302 may operate similarly to the proxy 204, however the proxy 204 may belong to a proxy service process whereas the proxy 302 may belong to a client process associated with the client 102.

The thread may be injected by a process having kernel-level permissions. The thread may run in the address space of the client 102 and take the PID of the client 102. Accordingly, communications from the proxy 302 may naturally take the PID and TID valid to the client 102. Thus, recipients of the communications from the proxy 302 may determine that the source of the communications was the client communication port 202, and not that of a different process. An example computing device capable of serving as a device implementing the proxy 302 is illustrated in FIG. 5 and described below with reference to that figure.

The client/service shared memory space 304 may be shared with the client 102 and the service 112, and not with a third process, for example not shared with a proxy service process. In various embodiments, the proxy 302 gains access to the shared memory space 304 by virtue of being a thread of the client 102. Similarly, the shared memory 306 may be accessible to the client 102 and the service 112, but not to a third process (other than kernel-level processes).

In various embodiments, the functionality depicted by FIG. 3 may be similar to that as depicted by FIG. 2. For example, a smaller message from the client communication port 202 to the service communication port 206 may pass through the proxy 302. Similarly, a larger communication written to the shared memory 306 may be intercepted by the proxy 302 when the proxy 302 receives an indication that either of the client 102 or the service 112 has written a data to the shared memory 306.

In some examples, the injected executable code may be injected into a program area of an existing thread of the process. This may enable the injected executable code to operate having the PID and TID of the existing thread.

Example Process

Figure 4:
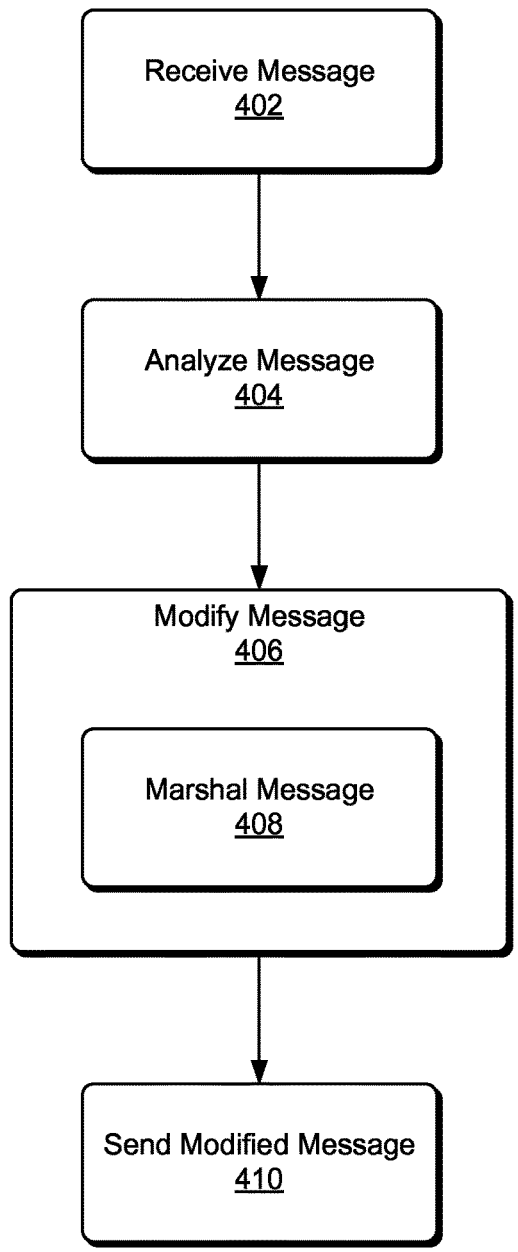
FIG. 4 illustrates example processes 400 to analyze and marshal a message while acting as a proxy.

FIG. 4 illustrates an example process 400 to analyze and marshal a message while acting as a proxy. This process is illustrated as logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The process 400 references subject matter described herein, particularly with respect to FIGS. 1-3. In various embodiments, the process 400 may be performed by a proxy service, such as the service proxy 116, the proxy 204, the proxy 302, or the like.

The process 400 includes, at 402, receiving a message from a sender. An address of the message may indicate an intended recipient. For example, the message may be addressed to an LPC service, such as the service 112, or addressed to a client, such as the client 102. The proxy service may intercept the message using the various techniques described herein, particularly with respect to FIGS. 1-3. Accordingly, the recipient may not know or may not be capable of determining that the proxy service receiving the message is not the intended recipient.

At 404, the message may be analyzed. For example, the proxy service may log the message, the message contents may be read, the proxy service may characterize the message as safe, unsafe, or unknown, the message may be checked for validity, or the like.

In various embodiments, a format of the message may be determined by an IDL associated with the service 112, a stub associated with the IDL, and/or by reverse engineering. The message may be analyzed based on the format of the message. For example, the format may indicate the location and/or format of a particular field in the message. The field may be dereferenced to determine a value of the field.

At 406, the message may be modified. As described herein, particularly with respect to FIG. 1, modifying may include transforming the message for a variety of purposes.

In general, the message may include the headers to identify the sender, to identify the receiver, to indicate the type of message being sent, to flag interactions (such as flagging the availability of information in a shared memory space), and/or to indicate a state of interaction between the client 102 and the service 112. The headers may include a sequence number, a message identifier, a PID, and/or a TID.

In various embodiments, the kernel and/or the service 112 may not process a message having incorrect or inconsistent information. Thus, the headers may be modified to indicate different information, for example to indicate information that appears correct or consistent with expected header information. For example, assuming the service proxy creates a new message using an LPC message creation resource, the new message may include header information indicating that the service proxy is the source of the message. The service proxy may then modify the header information to change the source to match the client 102 or the service 112, or the like. In another example, the header information may be modified to indicate the proxy service as the message source. In various embodiments, portions of the headers may be removed. In various embodiments, the values stored at portions of the header may be overwritten with a zero value or a default value.

At 408, the message may be marshaled. In general, marshaling may facilitate the sharing of data, particularly among different threads, processes, and/or computing devices. In various embodiments, the marshaling may include transforming memory representations of data, serializing data, deserializing data, complying with interface requirements, or the like.

At 410, the modified message may be sent to the intended recipient.

Example System

FIG. 5 illustrates a component level view of a computing device capable of acting as or including the client 102, the service 112, or a proxy, such as the service proxy 116, the proxy 204, or the proxy 302. As illustrated, computing device 500 comprises a system memory 502 storing modules and data 504. Also, computing device 500 includes processor(s) 506, a removable storage 508 and non-removable storage 510, input device(s) 512, output device(s) 514 and communication connections 516 for communicating with other computing devices 518.

In various embodiments, system memory 502 is volatile (such as RAM), non-volatile (such as ROM, flash memory, etc.) or some combination of the two. The modules or data 504 stored in the system memory 502 may comprise methods, threads, processes, applications or any other sort of executable instructions, such as the instructions utilized to perform the operations of the client 102, the service 112, or a proxy, such as the service proxy 116, the proxy 204, or the proxy 302. The modules and data 504 may also include files and databases.

In some embodiments, the processor(s) 506 is a central processing unit (CPU), a graphics processing unit (GPU), or both CPU and GPU, or other processing unit or component known in the art.

Computing device 500 also includes additional data storage devices (removable and/or non-removable) such as, for example, magnetic disks, optical disks, or tape. Such additional storage is illustrated in FIG. 5 by removable storage 508 and non-removable storage 510. Tangible computer-readable media may include volatile and nonvolatile, removable and non-removable media implemented in any method or technology for storage of information, such as computer readable instructions, data structures, program modules, or other data. System memory 502, removable storage 508 and non-removable storage 510 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 500. Any such tangible computer-readable media may be part of the computing device 500.

Computing device 500 also has input device(s) 512, such as a keyboard, a mouse, a touch-sensitive display, voice input device, etc., and output device(s) 514 such as a display, speakers, a printer, etc. These devices are well known in the art and need not be discussed at length here.

Computing device 500 also contains communication connections 516 that allow the computing device 500 to communicate with other computing devices 518.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more tangible computer-readable media storing computer-executable instructions configured to implement an observation service on a computer device, the observation service performing operations comprising:
   requesting, from a kernel-level resource, to rename a name-addressable port from an original name to a modified name;
   adding an entry to an object manager using the original name, the entry being associated with the observation service;
   receiving, from a caller and at the observation service, a communication addressed to the original name, the communication including a reference to a shared memory region;
   determining, from the communication, an availability of data written to the shared memory region by the caller;
   examining the data in the shared memory region;
   after examining the data in the shared memory region, modifying a process identifier (PID) or a thread identifier (TID) of the communication; and
   redirecting the communication to the name-addressable port addressed by the modified name.

2. The one or more tangible computer-readable media of claim 1, further comprising analyzing the communication.

3. The one or more tangible computer-readable media of claim 2, further comprising characterizing the communication as safe, unsafe, or unknown, based at least in part on the analyzing of the communication.

4. The one or more tangible computer-readable media of claim 2, further comprising determining a format of the communication based at least in part on an Interface Description Language (IDL) associated with a service accessible to the caller via the name-addressable port, wherein the analyzing of the communication is based at least in part on the format.

5. The one or more tangible computer-readable media of claim 1, wherein the observation service is configured to have less-than kernel-level permissions.

6. The one or more tangible computer-readable media of claim 1, further comprising:
   receiving, from the name-addressable port, an indication of a communication session including a reference to a server port;
   creating a session observation port;

modifying the indication of the communication session, including referencing the session observation port instead of the server port; and
providing the indication of the communication session to the caller.

7. The one or more tangible computer-readable media of claim 6, wherein
receiving the communication comprises receiving the communication at the session observation port,
the method further comprising requesting, from the kernel-level resource, to attach to the shared memory region; and
wherein redirecting the communication comprises sending, to the server port, a proxied message based, at least in part, on the communication that was received.

8. The one or more tangible computer-readable media of claim 7, further comprising analyzing a portion of the shared memory region.

9. The one or more tangible computer-readable media of claim 1, wherein the modifying of the PID or the TID of the communication generates a modified PID or TID that indicates the observation service as the source of the communication.

10. A computer-implemented method for observing a service comprising:
requesting to rename a name-addressable port of the service from an original name to a modified name;
adding an entry to an object manager using the original name, the entry being associated with an observation service;
receiving, from a caller and at the observation service, a communication addressed to the original name, the communication including a reference to a shared memory region;
determining, from the communication, an availability of data written to the shared memory region by the caller;
examining, by the observation service, the data in the shared memory region;
after examining the data in the shared memory region, modifying a process identifier (PID) or a thread identifier (TID) of the communication for transparent redirection; and
redirecting the communication to the name-addressable port addressed by the modified name.

11. The method of claim 10, further comprising analyzing the communication.

12. The method of claim 10, wherein the observation service is configured to have less-than kernel-level permissions.

13. The method of claim 10, further comprising:
receiving, from the name-addressable port, an indication of a communication session including a reference to a server port;
creating a session observation port;
modifying the indication of the communication session, including referencing the session observation port instead of the server port; and
providing the indication of the communication session to the caller.

14. The method of claim 13, wherein:
receiving the communication comprises receiving the communication at the session observation port,
the method further comprising requesting to attach to the shared memory region; and
wherein redirecting the communication comprises sending, to the server port, a proxied message based, at least in part, on the communication that was received.

15. A system comprising:
a processor; and
memory storing computer-executable instructions that, when executed by the processor, implement an observation service to:
request to rename a name-addressable port of a service from an original name to a modified name;
receive, from a caller, a communication addressed to the original name, the communication including a reference to a shared memory region;
determine, from the communication, an availability of data written to the shared memory region by the caller;
examine the data in the shared memory region;
after examining the data in the shared memory region, modify a process identifier (PID) or a thread identifier (TID) of the communication for transparent redirection; and
redirect the communication to the name-addressable port addressed by the modified name.

16. The system of claim 15, wherein the observation service is further configured to analyze the communication.

17. The system of claim 15, wherein the observation service is configured to have less-than kernel-level permissions.

18. The system of claim 15, wherein the observation service is further configured to:
receive, from the name-addressable port, an indication of a communication session including a reference to a server port;
create a session observation port;
modify the indication of the communication session, including referencing the session observation port instead of the server port; and
provide the indication of the communication session to the caller.

19. The system of claim 18, wherein:
receiving the communication comprises receiving the communication at the session observation port,
the computer-executable instructions, when executed by the processor, further implement the observation service to request to attach to the shared memory region; and
wherein redirecting the communication comprises sending, to the server port, a proxied message based, at least in part, on the communication that was received.

* * * * *